Aug. 28, 1951    D. B. CRUIKSHANK    2,565,479

COMMUNICATION SYSTEM

Filed June 30, 1949    3 Sheets-Sheet 1

Inventor

Douglas B. Cruikshank

By Harry M. Saragovitz

Attorney

Inventor
Douglas B. Cruikshank
By Harry M. Saragovitz
Attorney

Aug. 28, 1951 D. B. CRUIKSHANK 2,565,479

COMMUNICATION SYSTEM

Filed June 30, 1949 3 Sheets-Sheet 3

Inventor
Douglas B. Cruikshank

By Harry M. Saragovitz
ATTORNEY

Patented Aug. 28, 1951

2,565,479

UNITED STATES PATENT OFFICE 2,565,479

COMMUNICATION SYSTEM

Douglas B. Cruikshank, Alexandria, Va.

Application June 30, 1949, Serial No. 102,185

10 Claims. (Cl. 178—23)

(Granted under the act of March 3, 1883, as amended April 30, 1928; 370 O. G. 757)

The invention described herein, if patented, may be manufactured and used by or for the Government for governmental purposes without the payment of any royalties thereon.

This invention relates to communications systems and more particularly to a novel method of automatic transmission and reception of telegraphic messages. This method is especially suitable for transmission and reception of intelligence over both wire and radio circuits.

As is well known, present-day automatic telegraph systems employ complicated mechanical conversion means for performing the various operations incident to transmission and reception of messages. Such mechanical conversion means, which include cam-operated switches and numerous electro-mechanical devices, have certain inherent limitations imposed upon them by the inertia of moving parts with the consequent result relatively slow speeds of operation. It is, therefore, an object of this invention to provide a method which will employ inertialess electronic circuits, well known in the art, to produce a majority of the functions which are presently mechanical.

It is a further object of this invention to provide a system of communications which is capable of accommodating message transmission and reception speeds in excess of 300 words per minute.

It is also an object of this invention to utilize a novel telegraph code which may be effectively employed with the invention.

Still further objects and advantages of this invention will be apparent to those skilled in the art to which it relates from the following description of an embodiment thereof and more particularly pointed out in the appended claims.

In carrying out the present invention utilization is made of a seven-unit code wherein the signal is composed of four (4) voltage pulses preceded by a single activating pulse-plus-space, all of equal widths, arranged in all possible combinations within a sequence of seven (7) equal time spaces. This will provide thirty-four combinations which are sufficient to accommodate the twenty-six letters of the alphabet, an upper case shift in printing type machines, a stop key, a start key and a bell, and four additional characters to be utilized as desired. This code can be used in connection with the standard typewriter or teletype printer keyboard which in its present state of development is universally used.

In a preferred embodiment of the invention as herein described and illustrated, the transmitter provides a sequence of pulses at proper intervals in accordance with the code used. The circuit constants are selected to provide a pulse width of 1400 microseconds. It will be understood that the pulse width of 1400 microseconds is used for illustrative purposes only. A pulse width of 1400 microseconds will provide a maximum transmitting speed of three hundred and sixty (360), five-character words per minute, with an interval between characters equal to the overall width of the signal, i. e. $9\times1400=12{,}600$ microseconds. Referring to Figs. 1, 2 and 3, this time interval is represented by nine consecutive pulse-time intervals as follows:

$$t_1-t_0=t_2-t_1=t_3-t_2, t_0=t_9-t_8=1400 \text{ microseconds}$$

However, if it is desired to either increase or decrease the maximum speed of transmission, the pulse width may be decreased or increased by proper selection of components used in the system.

Briefly, depressing a "character key" of a typewriter or "printer" completes a direct-current circuit which produces a surge of current in a resistance-capacitance peaking circuit. This peaked pulse activates a start-stop multivibrator which is connected to that particular character circuit. Simultaneously with the triggering of the multivibrator in the foregoing circuit, another start-stop multivibrator is triggered by the pulse which is formed when any character key is closed, thus forming an "activating pulse" which precedes each signal and is used at the receiver to place it into an operating condition. The first-mentioned multivibrator produces a positive pulse of the desired width (1400 microseconds in the illustrated case) which is fed simultaneously to four (4) of a bank of seven delay lines. These four delay lines delay the pulse by differing increments of time so that when their outputs are added, four pulses are produced, occurring at regular intervals after the original activating pulse, which also appears. This train of pulses is then amplified and squared and fed to an outgoing line as the signal representing the particular character key depressed.

At the receiver station the signal comes in over the line and is fed directly to the grids of seven (7) amplifiers of a gating section. Simultaneously the signal is also fed through a resistance-capacitance peaking circuit to a start-stop multivibrator which generates a pulse of $t_2-t_1$ microseconds width. The circuit constants are selected so that the recovery time for the multivibrator is just greater than the interval $t_9-t_0$, so that it generate but one pulse per character. This pulse is peaked and is then fed through a series of start-stop multivibrators and resistance-capacitance peaking circuits so arranged in cascade that each one starts the next at intervals of 1400 microseconds. The negative pulses thus formed are fed to the cathode of amplifiers 1 through 7, respectively, of the gating section, thus making them responsive to pulses received during that time only. Such a pulse, if received and amplified, goes through a delay net which delays each pulse to the end of the character. There they add up to four times the value of any one of the pulses but do so in only the appropriate one of the biased keying amplifiers. The amplifiers are so biased that it takes more than three and less than five pulse-heights to make them conductive. Upon conduction, plate current flows through the solenoid of the particular teletypewriter striker which is thus energized.

The invention will now be described in further detail in connection with the accompanying drawings, in which Figure 1 is a block diagram representation of a transmitting system embodying the present invention.

For purposes of illustration, the description which follows will be based on the use of my invention in connection with a "printer" employing a standard keyboard. It may, however, be readily adapted for use with tape transmitters which operate at high speeds, actuated by a perforated paper tape that has had a message previously impressed on it.

Figure 1:
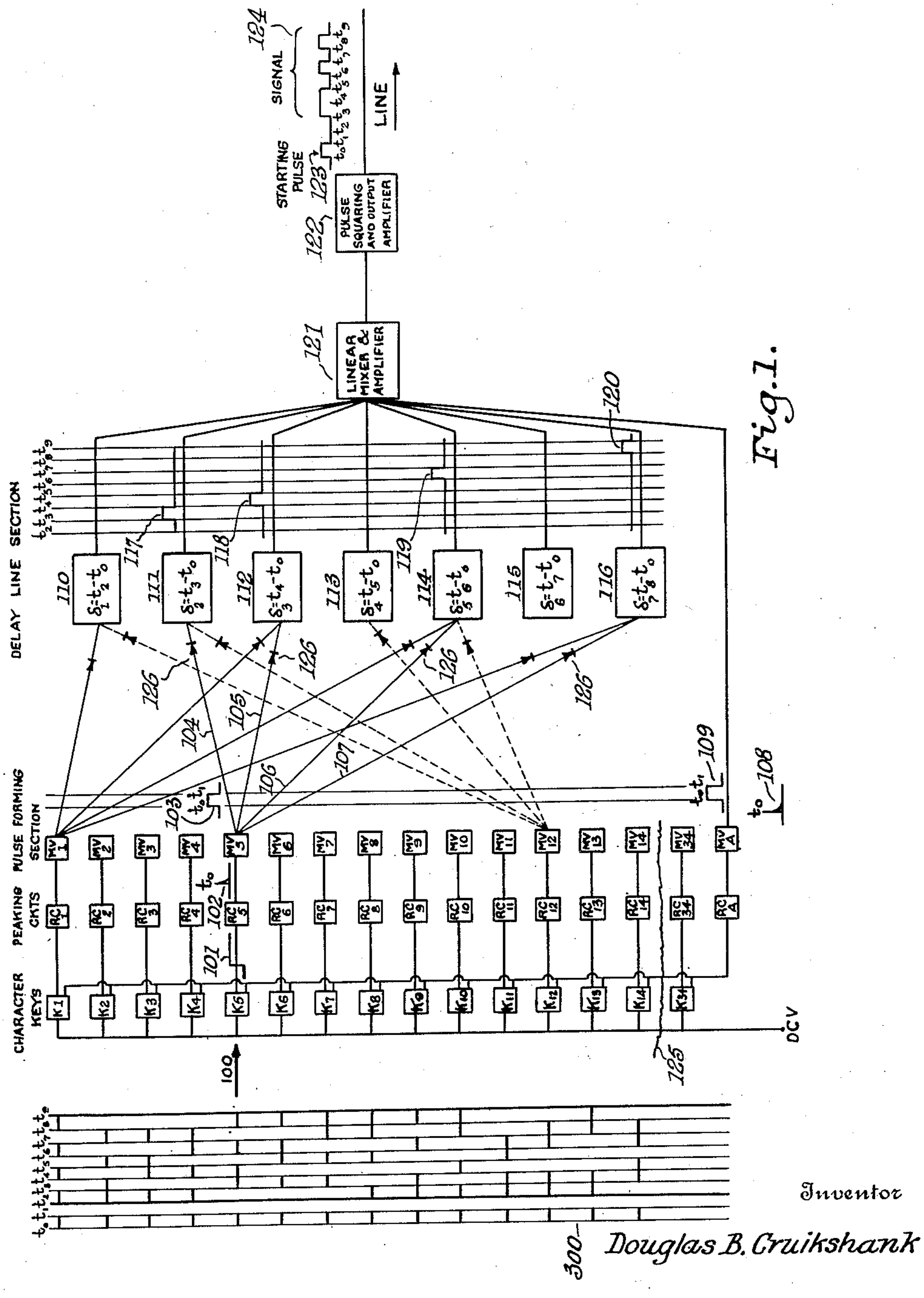
Figure 3:
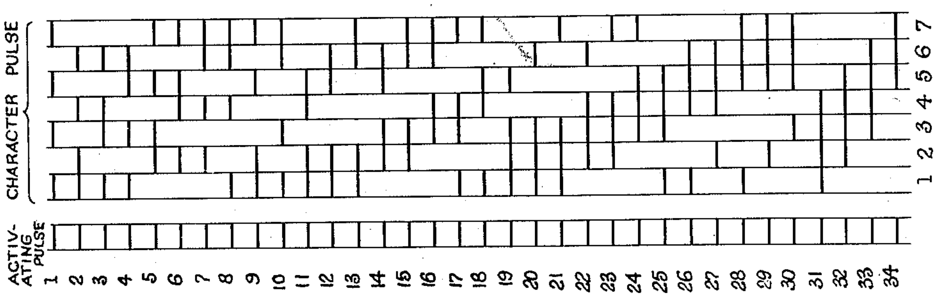
Figure 3 is a diagram of a novel signalling code which is preferably used in connection with my invention.

Referring now to the drawings, and in particular to Figure 1, the reference numeral 300 refers to a portion of the signalling code which is fully illustrated in Figure 3 but which is included in Figure 1 for purposes of clarity. Fourteen of the 34 possible code combinations are shown, each code combination corresponding to a "character key" on the keyboard of the typewriter or "printer." $K_1$ to $K_{34}$, inclusive, represent the individual character keys on the typewriter. For purposes of clarity all the keys are not shown, keys $K_{15}$ to $K_{33}$ are omitted and will be considered to occupy positions on the diagram indicated by the broken line 125. Character keys $K_1$ to $K_{34}$, inclusive, operate as circuit-closing means in the operation of the present invention, and are respectively connected to peaking circuits $RC_1$ to $RC_{34}$, inclusive. Peaking circuits $RC_1$ to $RC_{34}$ are resistance-capacitance networks of a well-known type which may be seen illustrated in "Electronic Circuits and Tubes" by Cruft Electronics Staff, page 147 and page 827, McGraw-Hill Book Co., New York, N. Y., 1947. Each resistance-capacitance circuit is in turn connected to its respective start-stop multivibrator circuit of a pulse-forming section. The start-stop multivibrators $MV_1$ to $MV_{34}$, inclusive, are of the type illustrated in "Electronics Circuits and Tubes" by Cruft Electronics Staff, pages 843 to 863, et seq., McGraw-Hill Book Co., New York, N. Y., 1947.

These start-stop multivibrators $MV_1$ to $MV_{34}$, inclusive, are provided with circuit constants which will produce a positive pulse of the desired width. In the particular embodiment of the invention being described, the pulse width is 1400 microseconds.

A direct-current source of potential, D. C. V, is used to supply the current in the circuit completed by the closing of character keys $K_1$ to $K_{34}$, inclusive. One side of the source of potential is connected common to character keys $K_1$ through $K_{34}$. A separate contact on $K_1$ through $K_{34}$ connects this source of potential, when any one of the above keys are closed, to the start-stop multivibrator $MV_A$, which is of the same categorical type as multivibrators $MV_1$ to $MV_{34}$, inclusive, through a peaking circuit $RC_A$, of the same categorical type as $RC_1$ through $RC_{34}$.

The output of each start-stop multivibrator, $MV_1$ to $MV_{34}$, inclusive, is fed simultaneously to four (4) of a bank of seven (7) delay lines, the particular four depending on the coded symbol desired for that key. These delay lines, 110 to 116, inclusive, are of a type well known in the art and may be of the type described in "Electronic Circuits and Tubes," by Cruft Electronics Staff, Chapter VIII, McGraw-Hill Book Co., New York, N. Y., 1947. For purposes of clarity the connecting means from each start-stop multivibrator to the delay sections are not all shown. For descriptive purposes, the connections from $MV_5$ are shown and indicated by reference numerals 104 to 107, inclusive, which are shown as connecting $MV_5$ with delay lines 111, 112, 114 and 116, respectively. These numerous connections between the pulse forming section and the delay lines include some form of "one way" impedances 126, such as diodes or other types of well-known rectifier units. These are included to reduce possible feedback due to the connections involved.

The four delay lines which are connected to a particular start-stop multivibrator of the pulse forming section delay the pulse by differing increments of time, so that when their respective outputs are combined, four pluses are produced and occur at desired intervals after the original activating pulse. For purposes of clarity Figure 1 includes a time division scale to the right of the delay line section. Since the pulses forming the code are combinations of 4 in 7, these time divisions are indicated by the reference symbols $t_2$, $t_3$, $t_4$, $t_5$, $t_6$, $t_7$, $t_8$, $t_9$. As will be seen by reference to a similar time division scale to the left of Figure 1, the time division $t_0$ to $t_1$ is used for the start pulse, and the time division $t_1$ to $t_2$ is used for a space.

In the particular condition illustrated in Figure 1, delay line 111 delays the pulse from $MV_5$ so that it occurs during the time interval $t_3$ to $t_4$ by delaying the pulse by an amount $d_2=t_3-t_0$. Similarly, delay line 112 delays the pulse from $MV_5$ so that it occurs during an interval $t_4$ to $t_5$, by delaying the pulse by an amount $d_3=t_4-t_0$. To complete the code, delay lines 114 and 116 delay the pulse from $MV_5$ by amounts $d_5=t_6-t_0$ and $d_7=t_8-t_0$, respectively. Thus, when these pulses are combined in the output they result in a pulse code combination corresponding to the character key depressed.

From the foregoing discussion, the sequence of connections to the other 33 start-stop multivibrators to combinations of 4 of 7 of delay lines 110 to 116, respectively, will be immediately apparent to those skilled in the art. Delay lines 110, 113, and 115 delay pulses recevied by them from the pulse forming section by the amounts $d_1=t_2-t_0$, $d_4=t_5-t_0$, and $d_6=t_7-t_0$, respectively.

The outputs of delay lines 110 to 116, inclusive, are fed into the input of a linear mixer and amplifier 121. A description of this type of amplifier may be found in "Electronic Circuits and Tubes," by Cruft Electronics Staff, Chapter XXIV, page 837, McGraw-Hill Book Co., New York, N. Y., 1947. The output of the amplifier is fed through a pulse squaring and output amplifier and then to an outgoing line. Pulse squaring and output amplifiers are well-known in the art and may be found fully explained and illustrated in "Massachusetts Institute of Technology, Radiation Laboratory Series," vol. 5, (Pulse Generators), Part II, Chapter 6, pages 175 to 213, McGraw-Hill Book Co., New York, N. Y., 1948. Reference numeral 124 illustrates the signal pulses as fed to the line. The starting pulse 123, as previously explained, forms a part of each code combination.

Figure 2:
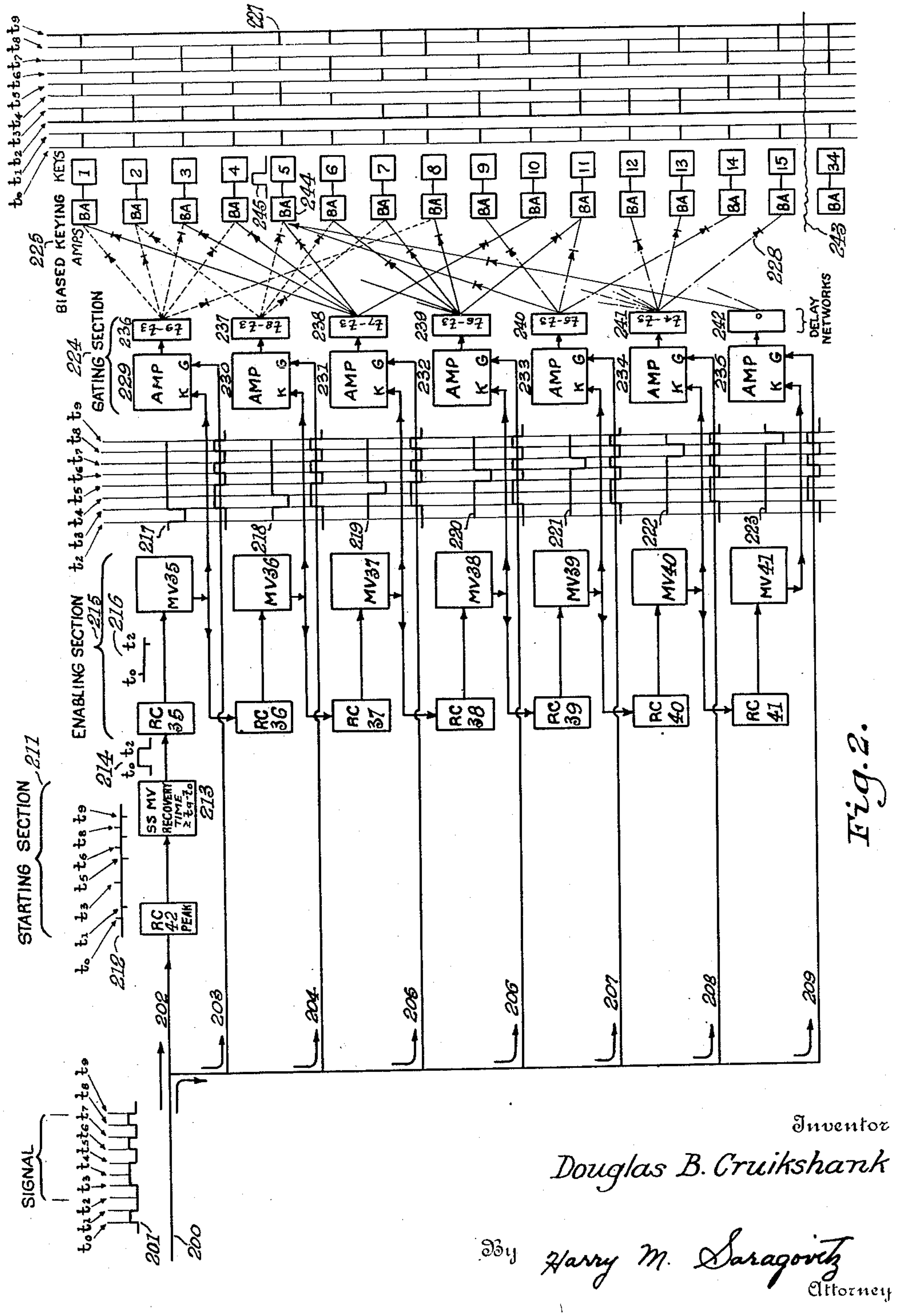
Figure 2 is a block diagram representation of a receiving system embodying the present invention.

Referring now to Figure 2, reference numeral 201 indicates a code combination, corresponding to a character, coming in over line 200. In the particular instance illustrated, signal 201 is identical to the signal impulse transmitted by the transmitter section and indicated by reference numberal 124 of Figure 1. For purposes of clarity the time division scale is again included. The block diagram arrangement of Figure 2 functions to sort out the signal received and feed the correct signal to its corresponding character type on the printing equipment. As indicated by Figure 2, signal 201 is fed simultaneously, over connections 203 to 209, inclusive, to the grid or input terminals G of the seven (7) gating amplifiers 229 to 235, respectively, and also via connection 202 through a resistance-capacitance peaking circuit $RC_{42}$ to a start-stop multivibrator 213. $RC_{42}$ and 213 are of the same categorical type as those referred to in the discussion of Figure 1. The start-stop multivibrator circuit 213, connected to trigger by a negative pulse, produces a pulse 214 of $t_2-t_1$ microseconds width and timing. The circuit constants of multivibrator 213 are such that the recovery time for the multivibrator is just greater than $t_9-t_0$, so that it generates only one pulse per character, or code combination. Pulse 214 is peaked by network $RC_{35}$ and fed into a series of start-stop multivibrators $MV_{35}$ to $MV_{41}$, inclusive, and a series of resistance-capacitance peaking networks $RC_{36}$ to $RC_{41}$, respectively. The multivibrators and peaking circuits are arranged alternately in cascade so that each one starts the next at intervals of 1400 microseconds or such time as is chosen for one pulse-width. Multivibrator $MV_{35}$ is of the type to be actuated by a negative peak, while multivibrators $MV_{36}$ to $MV_{41}$, inclusive, are actuated by positive peaks. The actuating sequence is illustrated by means of arrows on the diagram of Figure 2.

The multivibrators $MV_{35}$ to $MV_{41}$ produce negative pulses 217 to 223, inclusive. The negative pulses so formed are fed to the cathodes K of amplifiers 229 to 235, inclusive, of the gating section, thus making them responsive to signal pulses received during the duration of these negative pulses only. Such signal pulse, if received and amplified, is fed through a delay network which delays the pulse to the end of the character. The delay networks 236 to 242, inclusive, are associated with their respective amplifiers, 229 to 235 and are of the type previously described in connection with Figure 1. The outputs of the delay networks are connected to biased keying amplifiers BA of a well-known type. These amplifiers may be found completely described in "Electronic Circuits and Tubes" by Cruft Electronics Staff, Chapter XXIV, particularly page 837, McGraw-Hill Book Co., New York, N. Y., 1947. Amplifiers 229 to 235, inclusive, are so biased that it takes the voltage output of more than three, but less than five, pulses to make them conductive. Because of the manner in which the inputs of the biased keying amplifiers are connected to the output of the delay networks, that amplifier which is connected to the four delay networks involved in the transmission of a particular character will be made to conduct direct-current from a power supply of standard type (not shown), the others will remain non-conductive. That is, since in the example under consideration, bias keying amplifier 244 is connected to outputs of delay networks 237, 238, 240, and 242, these will add linearly in the output of the networks to provide the necessary input signal to overcome the bias of amplifier 244 causing it to conduct. Since the amplified outputs are connected to solenoids actuating a typewriter represented by character keys 1 to 34, inclusive, the output pulse 245 of amplifier 244 will energize the actuating solenoid (not shown) of character key 5 causing it to operate.

For a better understanding of the sequence of operations which take place during transmission and reception of signals in accordance with the present invention, let us assume that character key $K_5$ of Figure 1 has been depressed. The closing of $K_5$ completes a direct current circuit and applies source of potential D. C. V to the circuit. This results in a surge of current 101 which is passed through a peaking circuit $RC_5$. The peaked pulse 102 is used to activate the start-stop multivibrator in that circuit $MV_5$. Simultaneously with the closing of $K_5$, another start-stop multivibrator $MV_A$ is triggered, forming an "activating pulse" 109. This activating pulse precedes each signal and is used later to place the receiver into an operating condition. Multivibrator $MV_5$ produces a positive pulse 103 of the desired width $t_0-t_1=1400$ microseconds in the embodiment illustrated. Pulse 103 is then fed simultaneously to four (4) of a bank of seven (7) delay lines. In the assumed situation, pulse 103 is fed to delay lines 111, 112, 114 and 116, respectively. The function of the delay lines is to delay the pulse by differing amounts of time so that when their outputs are combined, four pulses are produced, occurring at proper intervals. These pulses are shown on Figure 1 as 117, 118, 119 and 120. The activating pulse is combined with pulses 117, 118, 119 and 120 to complete the code. These are then amplified by amplifier 121, and squared by amplifier 122 and fed out on the line as the desired signal 124.

Coming to the receiver end, Figure 2 shows the line 200, which delivers the signal 201 which, under the assumed condition corresponds to transmitted signal 124 of Figure 1. Signal 201 is fed directly to the grid circuits G of seven (7) amplifiers 229 to 235, inclusive, of the gating section, over lines 203 to 209, inclusive. The signal is also fed through a resistive-capacitive peaking circuit $RC_{42}$ and from there to start-stop multivibrator 213 which generates a pulse of $t_2-t_1$ microseconds width and timing. The circuit constants of 213 are such that its recovery time is just greater than $t_9-t_0$, so that it will generate only one pulse 214 per character. Pulse 214 is peaked by $RC_{35}$ as indicated at 216, and goes through a series of multivibrators and resistance-capacitive peaking circuits so arranged in cascade that each starts the next at intervals of 1400 microseconds (in the pulse width assumed for this instance). The path of the pulse is indicated by means of arrows in the enabling section 215 of Figure 1. The negative pulses which are formed are fed to the cathode circuits of amplifiers 229 to 235, respectively, of gating section 224, thus making them responsive to pulses received at their grids during that time only. Such a pulse, if received and amplified, is fed through a delay network which delays each pulse to the end of the character. There they add up to four times the value of any one pulse. This, however, happens only in the appropriate one of the biased keying amplifiers because of the above-described gating action and the connections made. In the example assumed the outputs of amplifiers 230, 231, 233 and 235 are delayed by networks 237, 238, 240 and 242, respectively, so that the input to the biased amplifier 244 associated with key 5 causes it to conduct and produce an output pulse 245 actuating key 5. The remaining biased amplifiers will receive signals not greater than 3 pulse-heights and hence will not conduct. Amplifiers BA are biased so that they require more than three and less than fivt pulse-heights to make them conductive. The output of the respective biased amplifiers BA energizes a solenoid (not shown) of the particular key to be actuated.

While the foregoing description related to the use of the invention in connection with communications, it will be apparent to those skilled in the art that it may be adapted to other uses. For example, present high-speed electronic computing machines are handicapped by the slowness of the printing of the answers produced by such machines. This applies to all types of digital computers. Particularly is this true of computers which utilize commercial printers, of the type used in printing telegraph systems, for the recording of results. Such results are limited to the maximum printing speed of such machines. Through the use of my invention in conjunction with the computer the speed of operation could be increased several times. Practically all types of computers which depend upon the use of printers could readily be modified to transmit a seven-pulse code adapting them for use with my invention.

While a preferred embodiment of the invention has been set forth in the drawings and specifications, other modifications thereof will readily occur to those skilled in the art without departing from the spirit of the invention as set forth in the appended claims.

I claim:

1. A communication system comprising a transmitting means, a receiving means, a communication channel between the transmitting and receiving means; said transmitting means comprising, a circuit including a source of potential, a plurality of circuit-closing instrumentalities each representing a character to be transmitted, means for producing a first pulse each time said circuit is closed and means for forming a series of pulses in accordance with a permutation code for each character to be transmitted, said last-named means including a plurality means each imparting a different time delay to said first pulse; means for producing a second pulse to be included with each of said series of pulses, means for amplifying and squaring said pulses and feeding them to said channel; said receiving means having means for receiving said pulses from said channel comprising a starting circuit, means for producing a chain of substantially square pulses, a gating section including amplifiers, and means for actuating a utilization device, said starting circuit responsive to said second pulse for producing one pulse per received character and actuating said means for producing a chain of substantially square pulses, said means for producing including means for gating the amplifiers of said gating section, means for feeding the incoming signal to each amplifier of said gating section whereby the signal triggers the amplifiers gated at the appropriate instant, delay means in the output of each amplifier of gating section to delay all pulses to the end of each character, and selective connections to a plurality of biased amplifiers from said delay means, whereby for each received signal character the outputs of certain of said gating amplifiers are added and impressed on the biased amplifier causing it to conduct and operate the utilization device.

2. A communication system in accordance with claim 1 wherein the said permutation code comprises a seven-unit code wherein each character to be transmitted is composed of four voltage pulses preceded by a singe actuating pulse.

3. A communications system comprising a transmitting means, a receiving means, and a communications channel between the transmitting and receiving means; said transmitting means comprising a circuit including a source of direct current potential, a plurality of circuit-closing instrumentalities each representing a character to be transmitted, means for producing a first pulse each time said circuit is closed including a resistance-capacitance pulse peaking circuit and a start-stop multivibrator, and means for forming a first series of pulses in accordance with a permutation code for each character to be transmitted, said last-named means including means for imparting different time delays to said pulse; means for producing an actuating first pulse to be included with each of said series of pulses, means for amplifying and squaring all pulses and feeding them to said channel; said receiving means having means for receiving said pulses from said channel comprising a starting section including means responsive to said actuating pulse only, an enabling section responsive to the output of said starting section, a gating section including a plurality of amplifiers, and means for actuating a utilization device, said starting section producing one pulse per received character-representing pulses and actuating said enabling section, said enabling circuit including means for gating the amplifiers of said gating section, said means comprising a series of multivibrator means for feeding the incoming signal to each amplifier of said gating section whereby the incoming signal triggers the amplifiers gated at the appropriate instant, delay means in the output of each of the amplifiers of the gating section to delay all pulses to the end of each character, and selective connections to a plurality of biased amplifiers from said delay means, whereby for each received character signal the outputs of certain of said amplifiers are added and impressed on said biased amplifier causing it to conduct and operate the utilization device.

4. In a communication system having a sending apparatus and a receiving apparatus, the combination in the sending apparatus of a circuit including a source of potential, a plurality of circuit-closing instrumentalities each representing a symbol to be transmitted, means in circuit with said instrumentalities to produce a pulse each time any of the same instrumentalities is operated, a plurality of delay means, means to initiate the sequential operation of selected delay means for producing a series of pulses representative of the symbol to be transmitted, and pulse squaring and amplifying means controlled by means connected to all of said delay means, for squaring and amplifying the produced pulses to produce pulses in the output of said amplifying means which are substantially of identical amplitude and time duration.

5. In a communication system having a transmitting means, a receiving means and a communication channel between the transmitting and receiving means, the combination comprising said transmitting means of a circuit including a direct current source of potential, a plurality of circuit closing means each representing a symbol to be transmitted, means in connection with said circuit closing means for producing a first pulse each time any of said circuit-closing means is operated, a plurality of delay means responsive to said first pulse for initiating the sequential operation of selected delay circuit means for producing a series of pulses representative of the symbol to be transmitted, means for producing a second pulse to be included with said series of pulses, said second pulse being produced simultaneously with said first pulse, and pulse squaring and amplifying means controlled by means connected to all of said delay circuit means and to means for producing said second pulses, for squaring and amplifying the series of pulses and said second pulse, to produce a series of pulses which are substantially of identical amplitude and time duration.

6. In a signaling system, means for producing groups of pulses, each pulse representative of a symbol to be transmitted, comprising a circuit including a source of potential, a plurality of circuit-closing instrumentalities in said circuit, each representing a symbol to be transmitted, means in circuit with said instrumentalities to generate a pulse each time any of the same instrumentalities is operated, a plurality of delay means to initiate the sequential operation of selected delay means for producing a series of pulses representative of a symbol to be transmitted, and pulse squaring and amplifying means controlled by means connected to all of the delay means, for squaring and amplifying the produced pulses in the output of said amplifying means which are in accordance with a predetermined code.

7. In a communication system having a transmitting means, a receiving means and a communications channel between the transmitter and receiving means, the combination comprising said receiving means of a circuit including means for receiving groups of pulses wherein each group represents a symbol transmitted by said transmitting means, said means for receiving comprising a starting circuit, an enabling circuit, a gating section including amplifiers, and means for actuating a utilization device, said starting circuit producing one pulse per received group and actuating said enabling sections, said enabling circuit including a plurality of trigger circuits arranged in cascade wherein they are triggered in a time sequence each producing a gating pulse, means for gating the amplifiers of said gating sections, means for feeding the incoming signal to each amplifier of said gating section whereby the group of pulses triggers the amplifiers gated by said gating pulse at the appropriate instant, delay means in the output of each amplifier of the gating section to delay all pulses of a group to the end of each symbol, and selective connecting means to a plurality of biased amplifiers from said delay means said connecting means including unidirectional conducting means for preventing coupling between biased amplifiers, whereby for each received group of pulses the outputs of certain gating amplifiers are added and impressed on the biased amplifier causing it to conduct and operate a utilization device.

8. A system for transmitting intelligence-bearing symbols comprising: means for producing a group of pulses representing a symbol to be transmitted, said pulses arranged in accordance with a permutation code, said means for producing comprising means for producing a first pulse, a plurality of means responsive to said first pulse each producing a second pulse, a plurality of delay means connected to each of said means responsive whereby said second pulse undergoes a different delay in passing through said delay means, and means for combining the outputs of said delay means and said first pulse thereby producing said group of pulses.

9. In a communications system utilizing permutation code signals for characters to be transmitted, said code signals comprising a plurality of voltage pulses preceded by a single pulse and in which all pulses are of equal widths, means for receiving said code signals comprising: a plurality of gating amplifiers, means for feeding said code signals to each of said amplifiers, means responsive to the first pulse only of said code signals, said means responsive producing an output pulse which sequentially triggers a plurality of pulse producing circuits, means connecting each of said pulse producing circuits to a respective gating amplifier, whereby each amplifier in turn is gated by the respective pulse producing circuit, a delay means connected to the output of each amplifier, said delay means delaying the pulses of a group to the end of each signal, and selective connecting means to a plurality of biased amplifiers from said delay means, whereby for each received group of code signals the outputs of certain gating amplifiers are added and impressed on the biased amplifier representing the signal received causing it to conduct and operate a utilization device.

10. A communications system comprising a transmitting means, a receiving means and a communications channel between the transmitting and receiving means; said transmitting means comprising a circuit including a source of direct current potential, a plurality of circuit-closing instrumentalities each representing a character to be transmitted, means for producing a first pulse each time said circuit is closed, means responsive to said first pulse for forming a series of pulses in accordance with a permutation code for each character to be transmitted, said last-named means including a plurality of delay circuits each imparting a different time delay to said first pulse; means for producing a starting pulse to be included with each of said series of pulses, and means for shaping all of said pulses and feeding them to said channel; said receiving means having means for receiving said pulses from said channel comprising: a starting circuit which is responsive to said starting pulse, means responsive to the output of said starting circuit for producing a sequential chain of gating pulses, said means responsive including a series of multivibrators, a plurality of gating amplifiers, means connecting the output of each of said multivibrators to a respective amplifier, means for feeding a portion of the output of certain of said multivibrators to initiate the operation of another of said multivibrators, means for feeding the series of pulses to each gating amplifier, whereby the signal triggers the amplifiers rendered operative by said gating pulses; delay means in the output of each amplifier to delay all pulses to the end of each character, and selective connections from said delay means made in accordance with said permutation code to a plurality of biased amplifiers, whereby for each received signal character the outputs of the gated amplifiers are added and impressed on the biased amplifier representing the signal character received causing it to conduct and to operate a utilization device.

DOUGLAS B. CRUIKSHANK.

REFERENCES CITED

The following references are of record in the file of this patent:

UNITED STATES PATENTS

| Number | Name | Date |
|---|---|---|
| Re. 22,394 | Moore et al. | Nov. 23, 1943 |
| 2,172,354 | Blumlein | Sept. 12, 1939 |
| 2,403,561 | Smith | July 9, 1946 |
| 2,412,974 | Deloraine | Dec. 24, 1946 |
| 2,415,345 | Loughlin | Feb. 4, 1947 |
| 2,443,198 | Sallach | June 15, 1948 |
| 2,471,138 | Bartelink | May 24, 1949 |

Certificate of Correction

Patent No. 2,565,479 August 28, 1951

DOUGLAS B. CRUIKSHANK

It is hereby certified that error appears in the printed specification of the above numbered patent requiring correction as follows:

Column 8, line 26, for "singe" read *single*;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*